United States Patent [19]

Lindbom

[11] Patent Number: 4,629,860
[45] Date of Patent: Dec. 16, 1986

[54] ROBOTIC APPARATUS AND METHOD FOR AUTOMATICALLY MOVING A TOOL THROUGH THREE DIMENSIONS AND MANUALLY TO AN EXTENDED POSITION

[76] Inventor: Torsten H. Lindbom, 1849 Kedron Cir., Fort Collins, Colo. 80524

[21] Appl. No.: 666,505

[22] Filed: Oct. 30, 1984

[51] Int. Cl.4 .............................................. B23K 9/12
[52] U.S. Cl. .................................... 219/125.1; 901/42
[58] Field of Search ........... 219/125.1, 125.11, 124.34, 219/124.22; 901/4, 5, 41, 42, 43; 318/560

[56] References Cited

U.S. PATENT DOCUMENTS

| | | | |
|---|---|---|---|
| 2,818,494 | 12/1957 | Bernard et al. | 219/125.1 |
| 4,014,495 | 3/1977 | Oda et al. | 228/7 |
| 4,086,522 | 4/1978 | Engelberger et al. | 318/568 |
| 4,229,641 | 10/1980 | Ihara | 219/125.1 |
| 4,409,650 | 10/1983 | Noguchi | 901/5 |
| 4,529,352 | 7/1985 | Suzuki et al. | 901/42 |

FOREIGN PATENT DOCUMENTS

| | | | |
|---|---|---|---|
| 53-136258 | 11/1978 | Japan | 901/42 |
| 55-144382 | 11/1980 | Japan | 219/125.1 |
| 56-47274 | 4/1981 | Japan | 901/42 |
| 56-41081 | 4/1981 | Japan | 901/42 |

Primary Examiner—Clifford C. Shaw
Attorney, Agent, or Firm—Sheridan, Ross & McIntosh

[57] ABSTRACT

A robotic welding apparatus has means for moving a tool assembly through a three dimensional space and along a computer controlled path. The tool assembly and a welding torch can be rotated about intersecting axes so as to change either or both the lead or drag angle and the weld angle of the welding torch.

16 Claims, 5 Drawing Figures

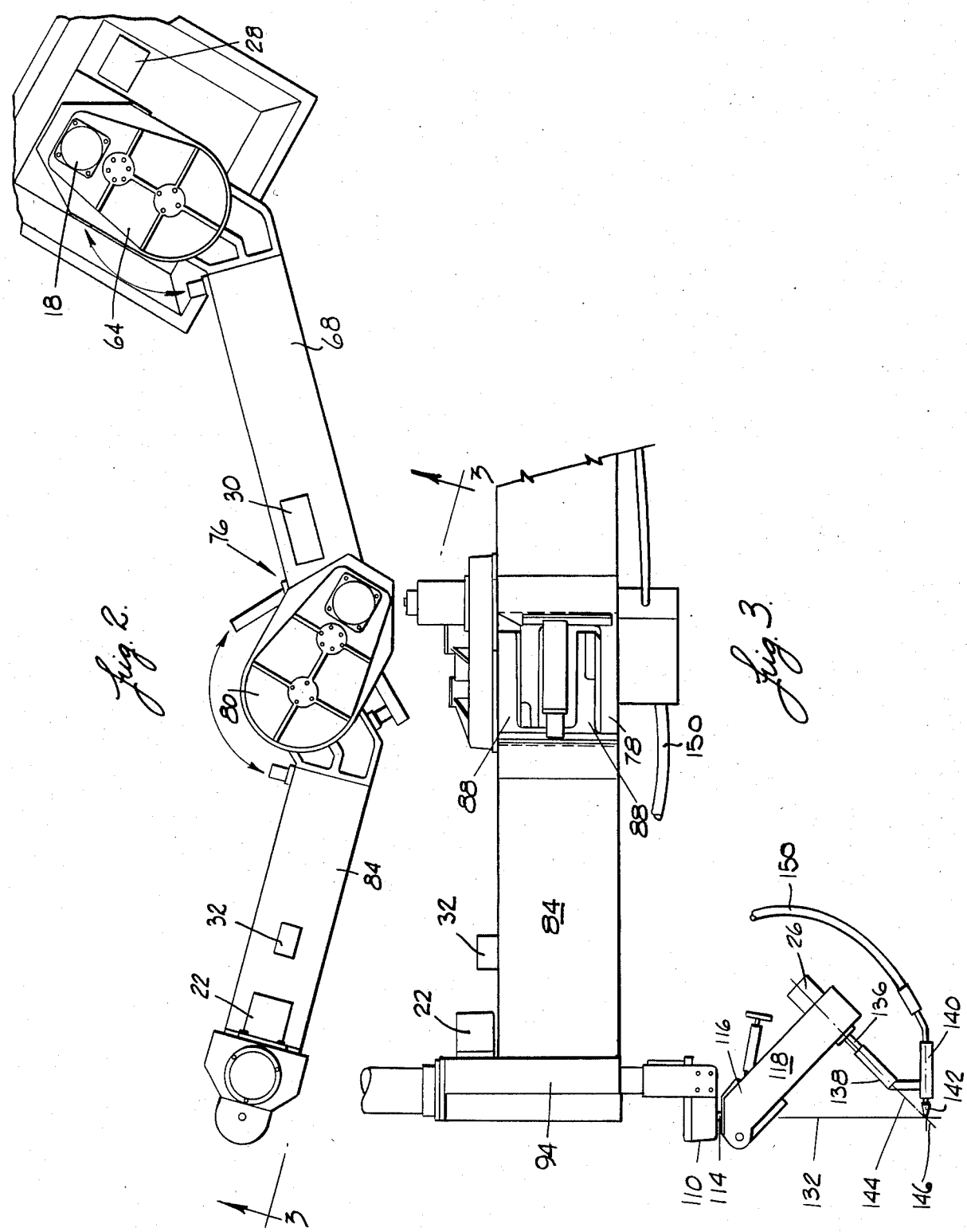

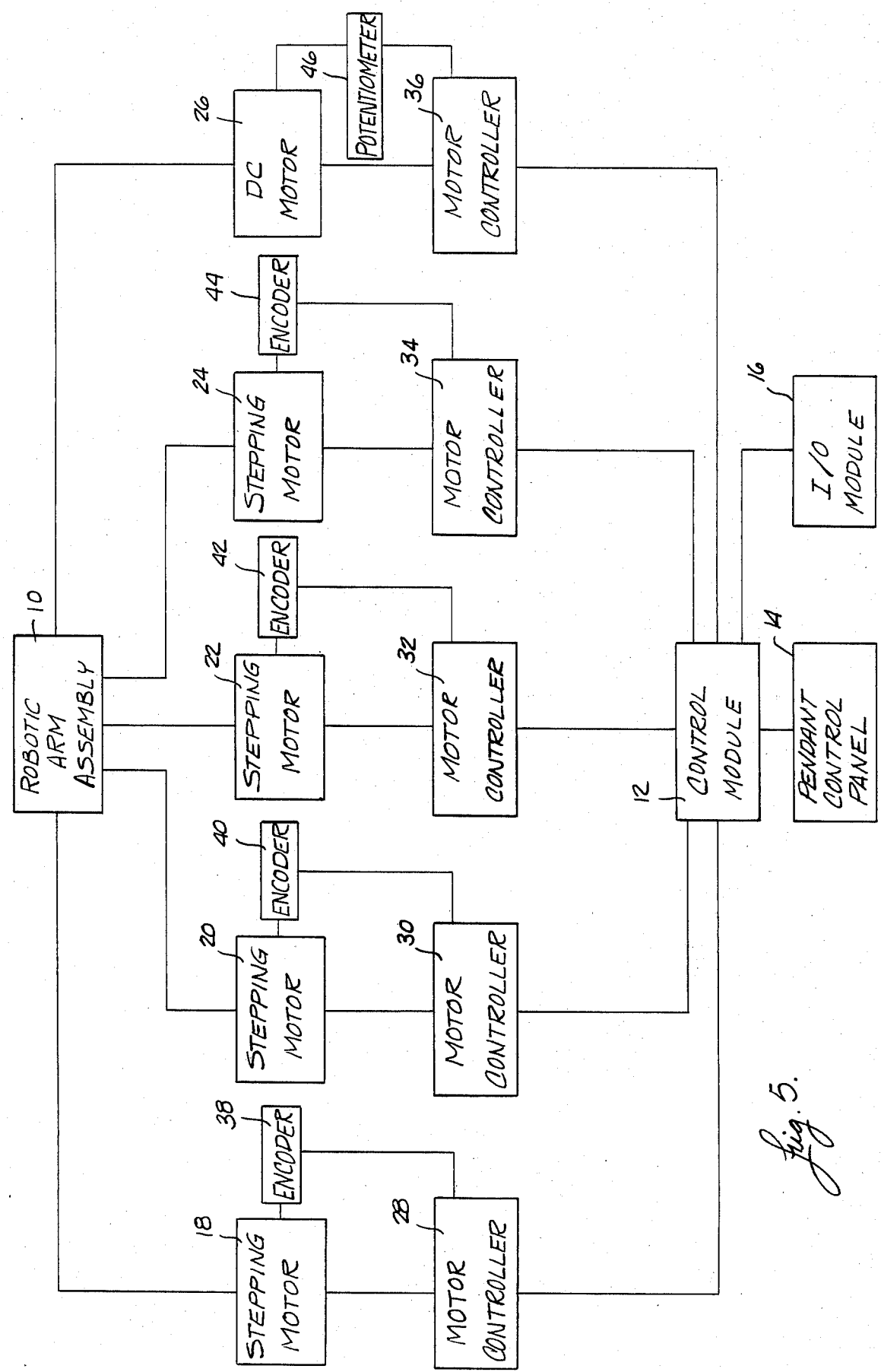

ROBOTIC APPARATUS AND METHOD FOR AUTOMATICALLY MOVING A TOOL THROUGH THREE DIMENSIONS AND MANUALLY TO AN EXTENDED POSITION

FIELD OF THE INVENTION

This invention relates to the field of moving a tool through a three dimensional space to perform work at various locations in the three dimensional space and more specifically to the moving of a welding torch through a three dimensional space to perform welding operations, continuously or at various locations in the three dimensional space, and during such welding operations to be able to change either or both the lead or drag angle and the weld angle of the welding torch.

BACKGROUND OF THE INVENTION

In the use of automatic welding apparatus, such as the apparatus disclosed in U.S. Pat. No. 4,014,495 to Oda et al. and in U.S. Pat. No. 4,229,641 to Ahara, the apparatus is moved automatically through a three dimensional space so that welding operations can be performed at various locations in the three dimensional space. Both of these patents also disclose that the welding tip may be rotated automatically about an axis while maintaining the welding tip on the axis of rotation so as to vary the lead or drag angle. However, neither of these patents disclose any means for automatically varying the weld angle of the welding torch relative to the tool. Therefore, with respect to the apparatus disclosed in both Oda et al. and Ahara, when a change in the weld angle is desired, the machine must be programmed to stop while the linkage, illustrated in FIG. 2 of Oda et al and FIGS. 7 and 8 of Ahara, is adjusted to change the weld angle.

A significant commercial market exists for an automatic welding apparatus used in non-repetitive or low volume, repetitive welding applications. Such areas include welding done in fabrication shops, manufacture of machinery structures, farm equipment, off highway equipment, equipment for the lumber and paper industry, tanks and vessels for the petroleum and chemical industries, and many on-site construction projects, such as shipbuilding. In order to use an automatic welding process in such operations, the teaching time associated with programming the apparatus to follow a desired path must be only a fraction of the weld time, e.g., the operator should be able to program in 1/6 of the actual welding time. Also, the method for programming must be relatively inexpensive since the volume of business is not great enough to afford the expense associated with the present commercialized robotic welding machines.

SUMMARY OF THE INVENTION

The present invention provides an apparatus and method for moving a tool, which in the preferred embodiment comprises a welding torch, through a three dimensional space to perform welding functions, continuously or at various locations in the three dimensional space, and during such welding operations to be able to change the lead or drag angle and also the weld angle of the welding torch.

In the preferred embodiment of the invention, movement of the welding torch over a three dimensional space is accomplished by an apparatus wherein one end of a first link thereof is mounted on a fixed base thereof for rotation about a fixed axis. The other end of the first link is connected to one end of a second link to provide relative pivotal movement of the first and second links about an axis. A member is connected to the other end of the second link for linear movement relative to the second link and in a direction perpendicular to the longitudinal axis of the second link. A tool assembly is mounted on one end of the member so that, as the first and second links and the member are moved, the tool assembly moves through a three dimensional space.

In the preferred embodiment of the invention, the tool assembly includes a tool holder mounted thereon, which tool is a welding torch. The tool assembly and the tool holder are provided with means so that the lead or drag angle and the weld angle may be varied as the welding torch is being moved in the three dimensional space. The welding torch is mounted in the holder so that the tip of the welding torch lies on a first axis extending through the means mounting the tool assembly to the member. Means are provided for rotating the tool assembly around the first axis and such rotation acts to vary the lead or drag angle. Means are provided to rotate the tool holder around a second axis. The tool holder is located so that the tip of the welding torch is located at the intersection of the first and second axes. Rotation of the tool holder around the second axis varies the weld angle of the welding torch relative to the tool. The tip of the welding torch remains at the intersection of the first and second axis during its rotation about such axes.

In the preferred embodiment, movement of the portions of the apparatus to provide the rotation of the tool relative to the desired axes is accomplished using a number of modes of operation. A teaching or programming mode is used to store information relating to a predetermined path along which the tool or welding torch is moved. A simulating mode is used to check the programmed path to make sure that it is the desired path. A welding mode is used during the actual welding operation. In providing the predetermined path, a reference position associated with the robotic arm assembly is established using information obtained regarding the position of shafts of motors, which are energized to cause rotation of the necessary links of the apparatus.

Based on the foregoing, it is an object of this invention to provide apparatus and method for moving a tool through a three dimensional space to perform work, continuously or at various locations in the three dimensional space, and during such movement to be able to automatically change the angular position of the tool.

It is a related object to be able to automatically change the weld angle and lead or drag angle of the tool when desired.

It is another object to program a desired path for the tool so that no manual intervention is required during subsequent movement of the tool.

It is yet another object of this invention to determine a reference position for the apparatus using motor shaft positions.

Further objects of the present invention will become readily apparent from the following discussion, when taken in conjunction with the accompanying drawings.

BRIEF DESCRIPTION OF THE DRAWING

FIG. 2 is a top plan view taken along the lines 2—2 of FIG. 1;

FIG. 3 is a side elevational view taken along the lines 3—3 of FIG. 2;

FIG. 4 is a side elevational view taken along the line 4—4 of FIG. 1; and

FIG. 5 is a block diagram showing the control system for moving the robotic arm assembly.

DETAILED DESCRIPTION OF THE PREFERRED EMBODIMENT

Figure 1:
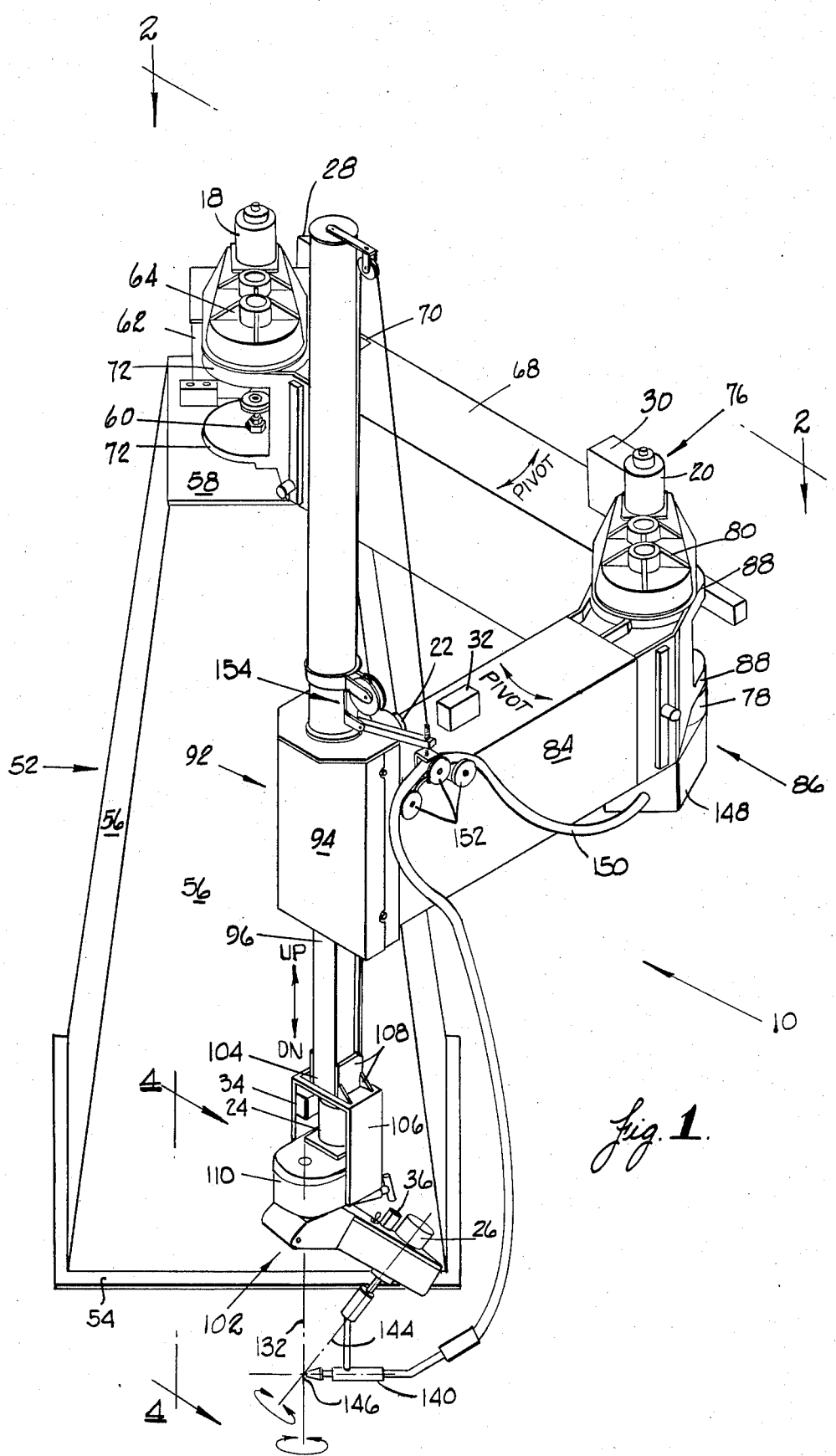
FIG. 1 is a pictorial view of the robotic arm assembly of the present invention.
Figure 1:
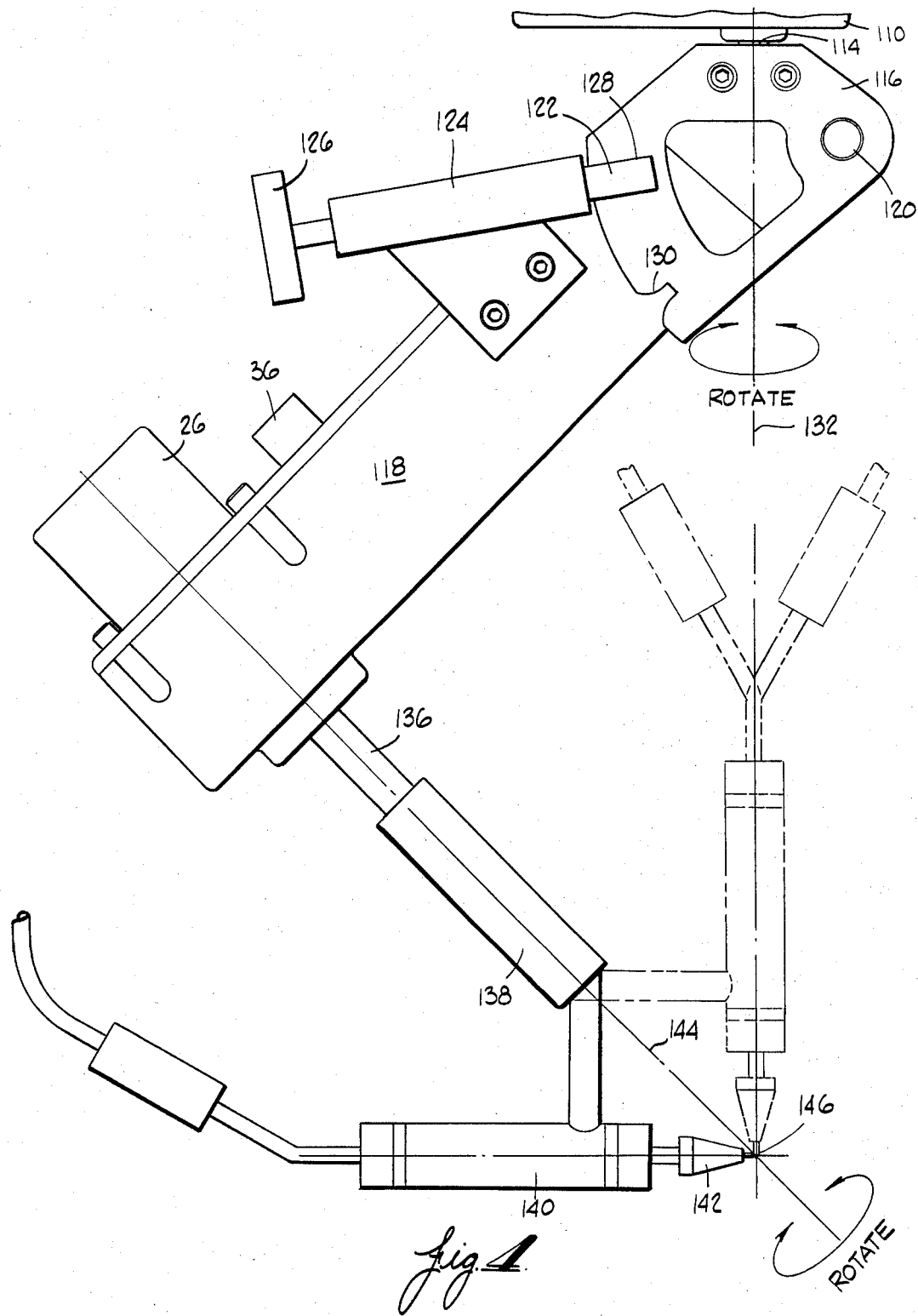

In accordance with the present invention, an apparatus is disclosed including a robotic arm assembly 10 and a system for controlling movement thereof so that a welding torch can be moved through a three dimensional space to provide welds at desired locations. The robotic arm assembly 10 is best illustrated in FIGS. 1–4. The preferred control system used in controlling movement of the robotic arm assembly 10 is diagrammatically shown in FIG. 5.

With reference first to FIG. 5, the control system includes a control module 12. The control module 12 preferably includes two processors, an executive processor that manages all interaction and communication with the user and peripheral equipment, and a servo processor that manages internal operations such as controlling the robotic arm assembly 10 and the welding operation itself. The two processor configuration permits the use of relatively less complex software in the critical time dependent control of the robotic arm assembly 10. The executive processor interfaces with the servo processor by way of a dual port memory. Each of the two processors includes the capability of locking the other out when desired.

The executive processor includes a CPU for providing necessary processing and memory space for storing executable code, as well as permanent data and variable data used in controlling the robotic arm assembly 10. The servo processor also includes a CPU and a memory storage area.

The control module 12 further includes a graphics display for providing the user with status information and for use in assisting the user in the selection of various welding-related operations. The control module 12 also has a keyboard used to input information to the system control.

A pendant control panel 14 communicates with the control module 12. The pendant control panel 14 is a portable panel used to control the basic operation of the robotic arm assembly 10. In that regard, the panel 14 has a number of control activators. A first activator is used in teaching or programming the system control so that data is stored corresponding to a desired or predetermined welding path. A second activator is used in simulating a previously taught welding path to determine whether the path taken by the robotic arm assembly 10 corresponds to the path previously programmed. A third activator is used in the welding process itself whereby the robotic arm assembly 10 is automatically moved along the previously programmed path and provides welds at the desired locations. A fourth activator is used in stopping movement of the robotic arm assembly 10. The pendant control panel 14 also has jog activators used to make corrections to a previously taught or programmed weld path. The executive processor of the control module 12 communicates with the pendant control panel 14 by means of a serial bus wherein the executive processor sends a strobe byte to the pendant control panel 14 which causes it to return two bytes specifying the status of the activators.

The system control further includes an I/O module 16 for use in communicating with and controlling peripherals. These peripherals are used in connection with the welding operation and include: a welding activator which is activated by the user during the teaching or programming operation to inform the system control of where welds are to be made; a power supply electrically connected to a welding torch; and a wire feeder device used to feed the welding material during the welding operation. The I/O module 16 communicates with the servo processor of the control module 12 over a serial bus.

The control module 12 also communicates with four stepping motors 18, 20, 22, 24 and a torque or DC motor 26. The four stepping motors and DC motor 18–26 are mounted to the robotic arm assembly 10 and are used to move portions of the robotic arm assembly 10 along a desired path by movements of portions of the robotic arm assembly relative to five different axes. Communication with the four stepping motors and DC motor 18–26 by the control module 12 is made through motor controllers 28, 30, 32, 34, 36. Each of the motor controllers 28–36 operates its respective motor and handles position feedback information. With respect to position information, encoders 38, 40, 42, 44 are coupled to the motor controllers 28–34. The encoders 38–44 monitor the amount of rotation of the shafts of each of the stepping motors 18–24 and supply this information to the respective motor controllers 28–34. Similarly, in connection with movement of the shaft of the DC motor 26, a potentiometer 46 is used to send information concerning the motor shaft movement to the motor controller 36. The DC motor 26 is used instead of another stepping motor because less accuracy is required in connection with the position of the DC motor shaft than is required for the stepping motor shafts. The effect of movement of the DC motor shaft on the robotic arm assembly 10 will be subsequently discussed.

Each of the motor controllers 28–34 includes a PAL chip programmed to decode signals from their respective encoders 38–44 while the motor controller 36 also includes a PAL chip to decode signals from the potentiometer 46. The motor controllers 28–36 also include microprocessors, with each PAL chip communicating with one microprocessor. The microprocessors control power to their respective motors 18–26 in order that the motor shafts move in the desired direction. Each of the motor controllers 28–34 also has a DAC/comparator circuit. This circuit is used in determining the desired amount of current to be generated in the respective servo motors 18–24 and for use in generating the desired amount of current.

In conjunction with the stepping motors 18–24, a preferred configuration used in driving and controlling them is disclosed in the U.S. patent application Ser. No. 658,775, filed Oct. 9, 1984, now abandoned, entitled "Motor Drive/Control Circuit".

The microprocessor of the motor controller 36 is basically used in powering the DC motor 26 full on until the desired position of the motor shaft is achieved. An A/D converter of the motor controller 36 responds to the potentiometer 46 and provides the inputted shaft position information received therefrom to the microprocessor.

With reference now to FIGS. 1–4, the robotic arm assembly 10 is more fully discussed and, in particular, the operation thereof in combination with the system control illustrated in FIG. 5.

The robotic arm assembly 10 includes fixed base 52 having a bottom support 54 which may be secured to a foundation (not shown). A plurality of side walls 56 are secured to the bottom support 54 and are closed at the top by a plate 58. The shape of the fixed base 52 is basically that of a truncated pyramid.

Mounted on the plate 58 is one portion of the first pivot assembly and includes a pivot support 60, a support structure 62, a gear box 64 and the stepping motor 18. A first link 68 is connected at one end 70 to the other portion of the first pivot assembly. This other portion comprises spaced apart members 72 which are connected to the pivot support 60 and gear box 64 so that the first link 68 may pivot around a vertical axis extending through the pivot support 60. The motor controller 28 is also mounted on the plate 58 and is electrically connected to the stepping motor 18 which drives a gear in the gear box 64 to pivot the first link 68 around the vertical axis extending through the pivot support 60.

A second pivot assembly is located at the opposite end 76 of the first link 68. One portion thereof includes a pivot support member 78 extending from the lower portion of the link 68, a gear box 80, and the stepping motor 20 secured to the upper portion of the link 68. A second link 84 is connected at one end 86 to the other portion of the second pivot assembly and comprises spaced apart members 88 connected to the pivot support member 78 and the gear box 80 so that the second link 84 may pivot around a vertical axis extending through a pivot support (not shown but similar to pivot support 60) in the pivot support member 78. The motor controller 30 is mounted on the upper portion of the link 68 and is electrically connected to the stepping motor 20 which drives a gear in the gear box 80 to pivot the second link 84 around the vertical axis extending through the pivot support in the pivot support member 78.

At the other end 92 of the second link 84, there is mounted a housing 94 for supporting a member 96 so that it may be moved up and down in a linear direction along a vertical axis extending therethrough. All of the vertical axes referred to above are parallel to each other. Means for supporting and moving the member 96 are located in the housing 94 and are driven by the stepping motor 22. Any conventional means may be used, such as a link arrangement, a prismatic joint or a rack and gear, to support and move the member 96; however, the means has to permit free movement of the member 96. Also, it is important that the member 96 be balanced against gravity forces so that the forces present during teaching or programming the robotic arm assembly 10 will be the same forces present during the actual welding operation. Conventional means are available to accomplish this balancing, such as a counterweight; a spring with a linkage arrangement; a negator spring or a torque motor with a prismatic joint. The motor controller 32 is mounted on the second link 84 and is electrically connected to the stepping motor 22, which is used in moving the member 96 in the desired linear direction along the vertical axis.

A tool assembly 102 is mounted on the end 104 of the member 96 for movement therewith. The assembly 102 includes a frame 106 secured to the member 96 by brackets 108. A gear box 110 is mounted on the frame 106 and the stepping motor 24 is supported by and operatively connected to the gear box 110. An assembly or means for extending the apparatus is also illustrated in FIG. 4. In particular, extending out of the gear box 110 is a shaft 114 on which is mounted a support structure 116. An arm 118 is pivotally mounted to the support structure 116 on rod 120. A movable pin 122 normally urged outwardly from the housing 124 is connected to a handle 126 for movement therewith. The support structure 116 is provided with two notches 128 and 130 for cooperating with the pin 122 for holding the arm 118 in a desired relationship with the support structure 116. When the shaft 114 is rotated, about the axis 132, the support structure 116 and the arm 118 also rotate around the same axis 132. The motor controller 34 is also mounted on the frame 56 and is electrically connected to the stepping motor 24 for use in rotating the shaft 114 in order to rotate the support structure 116 and the arm 118 around the axis 132, which rotation controls a lead or drag angle relating to a welding torch as described below.

The DC motor 26 is mounted on the arm 118 and a shaft 136 extends outwardly from the DC motor 26 and is rotated thereby. A holder 138 is connected at one end to the shaft 136 and is provided with means 140 at the other end for holding the work piece, which in the preferred embodiment comprises a welding torch 142 which is rotably mounted in the means 140 to allow for proper movement of the welding cable. Rotation of the shaft 136 around an axis 144 also rotates the holder 138 and the welding torch 142 around the axis 144. The motor controller 36 is mounted on the arm 138 and is electrically connected to the motor 26 for rotating the shaft 136 and thereby rotate the holder 138 and the welding torch 142. As illustrated in FIGS. 1 and 3, the axes 132 and 144 intersect at a point 146. The welding torch 142 is positioned in the means 140 of the holder 138 so that the tip of the welding torch 142 is located at the point 146 when the pin 122 is in notch 128. The angle between the axis 144 and the centerline of the means 140 is substantially the same as the angle between the axes 132 and 140 and is between about 30° and 70° and preferably is about 45°. Rotation of the support structure 116 and the arm 118 around the axis 132 and the rotation of the holder 138 and welding torch 142 around the axis 144 cause the lead or drag angle and also the weld angle of the welding torch 142 to change relative to the article being welded. Rotation around axis 132 functions to change the lead or drag angle while rotation around axis 144 functions to change the weld angle. During rotation of the welding torch 142 around axes 132 and 144, the tip of the welding torch 144 always is located at the point 146.

In some welding operations, it may be necessary to weld in areas located under a projection. In those instances, the pin 122 is pulled into the housing 124 and the arm 118 is pivoted until the pin is aligned with the recess 130 and the pin 122 is then engaged in the recess 130 to hold the arm in that position. The holder 138 moves with the arm 118 so that the tip of the welding torch 142 is moved away from the point 146. When in this position, rotation around axis 144 is not practical. However, rotation around axis 132 may be used but such operation requires cooperative movement of the first and second links 68 and 84 and the member 96.

In connection with providing the welding material to the welding torch 142, a conventional control unit 148 of a wire feed MIG welding torch is secured to the lower surface of the second link 84 and meters the flow of the gases and welding wire to the welding torch 142. A cable 150 extends from the unit 148 and is supported on rollers 152 which are supported by means 154 mounted on the housing 94.

OPERATION

Operation of the robotic arm assembly 10 is now discussed relating to the teaching, simulating, and welding functions associated therewith. In order to provide a desired path along which the welding torch 142 is moved, the user must teach or program the present invention with the desired path. Generally, this is accomplished by movement of the robotic arm assembly 10 including the welding torch 142 by the user along the desired path. The encoders 38–44, communicating with the shafts of the stepping motors, and the potentiometer 46 connected to the shaft of the DC motor 26 output position information which is stored for later use during the welding operation. More particularly, the teaching activator of the pendant control panel 14 is activated to cause a teach command to be sent from the servo processor of the control module 12 to the motor controllers 28–36 specified in the teach command. In conjunction with the teach command, the motor controllers 28–36 collect data relating to the weld path as the robotic arm assembly is moved by the user. This data collection is accomplished using a sync command. The sync command is generated each time one of the motor shafts moves a predetermined amount. This predetermined amount of movement is monitored by the encoders 38–44 and the servo potentiometer 46 associated with the motors 18–26. Each command associated with the teaching mode includes data corresponding to a predetermined amount of movement. The motor shaft, which is the first to achieve the predetermined amount of movement, causes the sync command to be generated. After the sync command is generated, a report last sync position command is generated. With this command, all motor controllers 28–36 report their encoder, or potentiometer position in the case of the DC motor 26, during the last sync command. That is, the report last sync position command is used to retrieve the data collected after a teach command was issued, and a microprocessor of one of the motor controllers 38–46 produced a sync command because a predetermined amount of movement, as called for in the teach command, was made by the motor shaft associated with that motor controller.

In addition to monitoring the encoder or potentiometer positions, the microprocessors of each motor controller 28–36 also keep track of the time at which the collected data was received by use of a clock wherein all clocks of the motor controllers 28–36 are resynced each time another set of data is obtained from the five motor controllers 28–36. The position information data collected and the time of the collection are stored in the control module 12 for subsequent operations of the present invention.

In the preferred embodiment, the position information stored relates to an absolute position from a starting reference position for that data obtained during those movements of the robotic arm assembly 10, other than those movements which occur during the welding portion of the movement. In the case in which welding is to be provided by the welding torch 142, a relative position is stored giving position information which is relative to the last position stored. The use of relative position information is preferable in such a situation because relatively small increments are more important during the actual welding itself than is the position information which is associated only with movement of the robotic arm assembly 10 and not the welding.

During the teach mode, the weld points are programmed using the weld activator electrically communicating with the I/O control module 16. Whenever a weld is desired, the user activates the weld activator so that the servo processor of the control module 12 stores this information relating to each of the weld points. After the user has programmed the invention by moving the robotic arm assembly 10 along the desired path whereby position and time information is stored in the servo processor of the control module 12, the user typically then activates the simulating mode activator on the pendant control panel 14. During this simulation, the robotic arm assembly 10 moves along the previously programmed path at a relatively slower rate of speed so that the user can observe the path taken by the robotic arm assembly 10. In such a manner, the user can determine whether the robotic arm assembly 10 has been programmed properly. If not, the user can make desired corrections or modifications to the path during the simulating mode. In accomplishing movement of the robotic arm assembly 10 using the previously programmed information, the servo processor of the control module 12 sends a move command to the motor controllers 28–36 for which movement of their corresponding motor shafts is required. Accompanying the move command is position data which corresponds to the position that the encoder or servo potentiometer associated therewith should be at upon completion of the execution of the move command. In addition to the position information, time data is also provided corresponding to the amount of time it should take for the movement. In the preferred embodiment, each motor controller 28–36 has a queue of move commands and executes each in turn with a new move command added to the end of the queue as a move command is executed. With the completion of the simulating mode, the user can then activate the welding operation whereby the welding torch 142 automatically follows the predetermined, programmed path and performs the welding function at the programmed locations. During actual welding, the welding torch 142 moves relatively more rapidly than during the simulating mode when the robotic arm assembly 10 is merely traversing to desired weld points. During actual welding however, the welding torch 142 moves at a speed sufficient to provide quality welds at the desired locations. In accomplishing the welding operation, like in the simulating operation, the servo processor of the control module 12 provides blocks of move commands to cause the robotic arm assembly 10 and the welding torch 142 to move along the programmed path.

The servo processor of the present invention also provides smooth movement of the robotic arm assembly 10 by use of software which interpolates the position data obtained during the teaching operation so that continuous, precise data is available for each of the five motor controllers 28–36. The interpolation computations are made during the simulation or welding modes.

In connection with a reference position for the robotic arm assembly 10, another command sent to the motor controllers 28–36 by the servo processor is a nest command. This command causes each of the motor controllers 28–36, when addressed, to move their corresponding motor shafts to their "nest" position. The nest position is defined as the position in which all motor shafts are up against their stops. System control is able to determine whether a motor shaft is at its nest position by comparing the magnetic position of the motor with the actual position thereof. That is, when the motor shaft is against a hard stop, the magnetic position of the motor advances but the physical position of the motor shaft is not changed. Consequently, when the discrepancy or difference between the magnetic position of the motor and its actual position is greater than a predetermined amount, it is determined that the motor shaft is at its hard stop. In such a manner, a reference or nest position of the robotic arm assembly can be determined by the present invention.

In view of the foregoing description, a number of salient features of the present invention are readily discerned. An apparatus is disclosed that is able to automatically and simultaneously change both the weld angle and the lead or drag angle associated with a welding torch. As a result, no manual intervention by the user is required to change linkages of the apparatus during the welding operation. Relatedly, various kinds of welding jobs can be done more efficiently. In achieving a desired weld path, the programming of the apparatus is also easily accomplished. Lastly, a reference position for the apparatus for use in programming a desired path is more readily determined.

Although the present invention has been described primarily with respect to a particular embodiment and application, it is readily appreciated that variations and modifications can be effected within the spirit and scope of this invention.

What is claimed is:

1. Apparatus wherein a tool is moved through a three-dimensional space and along a predetermined path in response to signals and in which the tool is also movable to an extended position so that the tool can perform work on an object comprising:
   (a) a fixed base;
   (b) a plurality of interconnected elements having one end connected to said base and terminating at another end;
   (c) means responsive to said signals to move said interconnected elements and to move said another end through three dimensions to a desired location;
   (d) a tool assembly attached to said another end;
   (e) a tool holder attached to said tool assembly;
   (f) a tool mounted in said tool holder;
   (g) means responsive to said signals to move said tool assembly to adjust a first angular relationship between said tool and said object;
   (h) means responsive to said signals to move said tool holder to adjust a second angular relationship between said tool and said object;
   (i) extending means connected to said tool assembly for permitting extended movement of said tool wherein said extending means includes a first position in which said first and second angular relationships are adjusted and a second position in which said tool is moved to an extended position in order to access a relatively more remote work area;
   (j) arm means operably connected to said extending means; and
   (k) shaft means connected to said arm means, said shaft means being at a fixed, predetermined angle relative to said arm means, said angle being selected to optimize the extension of said tool when said extending means is in said second position.

2. Apparatus as in claim 1 wherein:
   (a) said movement of said tool assembly is rotational about a first axis; and
   (b) said movement of said tool is rotational about a second axis.

3. Apparatus as in claim 2 wherein:
   said tool is attached to said tool assembly so that extensions of said first axis and said second axis intersect.

4. Apparatus as in claim 3 wherein:
   the angle between said intersecting first and second axis is between about 30° and 70°.

5. Apparatus as in claim 4 wherein:
   said tool comprises a welding torch.

6. Method wherein a tool is moved through a three-dimensional space and along a predetermined path in response to computer actuated signals and in which the tool is manually moved to an extended position so that the tool can perform work on an object, comprising:
   (a) providing a fixed base;
   (b) interconnecting a plurality of elements;
   (c) connecting one end of said interconnected elements to said base and terminating said interconnected elements at another end;
   (d) moving said interconnected elements in response to said computer actuated signals to move said another end through three dimensions to a desired location;
   (e) attaching a tool assembly to said another end, said tool assembly including an arm means, a shaft means, a pin, and first and second notches;
   (f) attaching a tool holder to said tool assembly;
   (g) positioning said shaft means at a fixed, predetermined angle relative to said arm means and positioning said pin in said first notch;
   (h) mounting a tool in said tool holder;
   (i) moving said tool assembly in response to said computer actuated signals to adjust a first angular relationship between said tool and said object;
   (j) moving said tool holder in response to said computer actuated signals to adjust a second angular relationship between said tool and said object;
   (k) determining that said tool is to be extended for reaching a relatively more remote work area;
   (l) manually removing said pin from said first notch;
   (m) re-positioning said pin in said second notch; and
   (n) manually moving said tool to the relatively more remote work area.

7. A method as in claim 6 wherein:
   (a) said moving of said tool assembly comprises rotating said tool assembly about a first axis; and
   (b) said moving of said tool holder comprises rotating said tool holder about a second axis.

8. A method as in claim 7 and further comprising:
   attaching said tool holder to said tool assembly so that extensions of said first axis and said second axis intersect.

9. A method as in claim 8 wherein:
   forming an angle between about 30° and 70° between said first and second extended axes.

10. A method as in claim 9 and further comprising:
    (a) locating said one end on a first link;
    (b) pivotally connecting said one end of said first link to said base;
    (c) pivotally connecting the other end of said first link to one end of a second link;
    (d) connecting a member to the other end of said second link so that said member may move in a linear direction relative to said second link; and (e) locating said another end at one end of said member.

11. A method as in claim 10 and further comprising:
balancing said interconnected elements so that they are supported in the same manner during manual movement or driven movement in response to said computer actuated signals.

12. A method as in claim 10 and further comprising:
using a welding torch as said tool.

13. A method as in claim 6 further including:
moving said interconnected elements in cooperation with moving said tool assembly to adjust said first angular relationship when said pin is in said second notch.

14. A method as in claim 6 further including:
keeping from adjusting said second angular relationship when said pin is in said second notch.

15. Apparatus as in claim 1 wherein:
said fixed, predetermined angle equals about 90°.

16. Apparatus in which a tool is moved through a three-dimensional space and along a predetermined path in response to signals and in which the tool is also manually movable to an extended position so that the tool can perform work on an object comprising:
(a) a fixed base;
(b) a plurality of interconnected elements having one end connected to said base and terminated at another end;
(c) means responsive to said signals to move said interconnected elements and to move said another end through three dimensions to a desired location;
(d) a tool assembly attached to said another end, said tool assembly including pin means, first and second notch means, link means, and a tool, said tool, said pin means, and said first and second notch means being connected to said link means, said pin means being movable between said first notch means and said second notch means; and
(e) means responsive to said signals to move said tool assembly to adjust a first angular relationship and to adjust a second angular relationship between said tool and said object, said pin means being positioned in said first notch means when using said means responsive to said signals to adjust said first angular relationship and said second angular relationship, and said pin means being positioned in said second notch means to manually move said link means and to optimize the extension of said tool.

* * * * *